3,057,699
CONTINUOUS CLOSED CIRCUIT APPARATUS FOR RENDERING ANIMAL MATTER

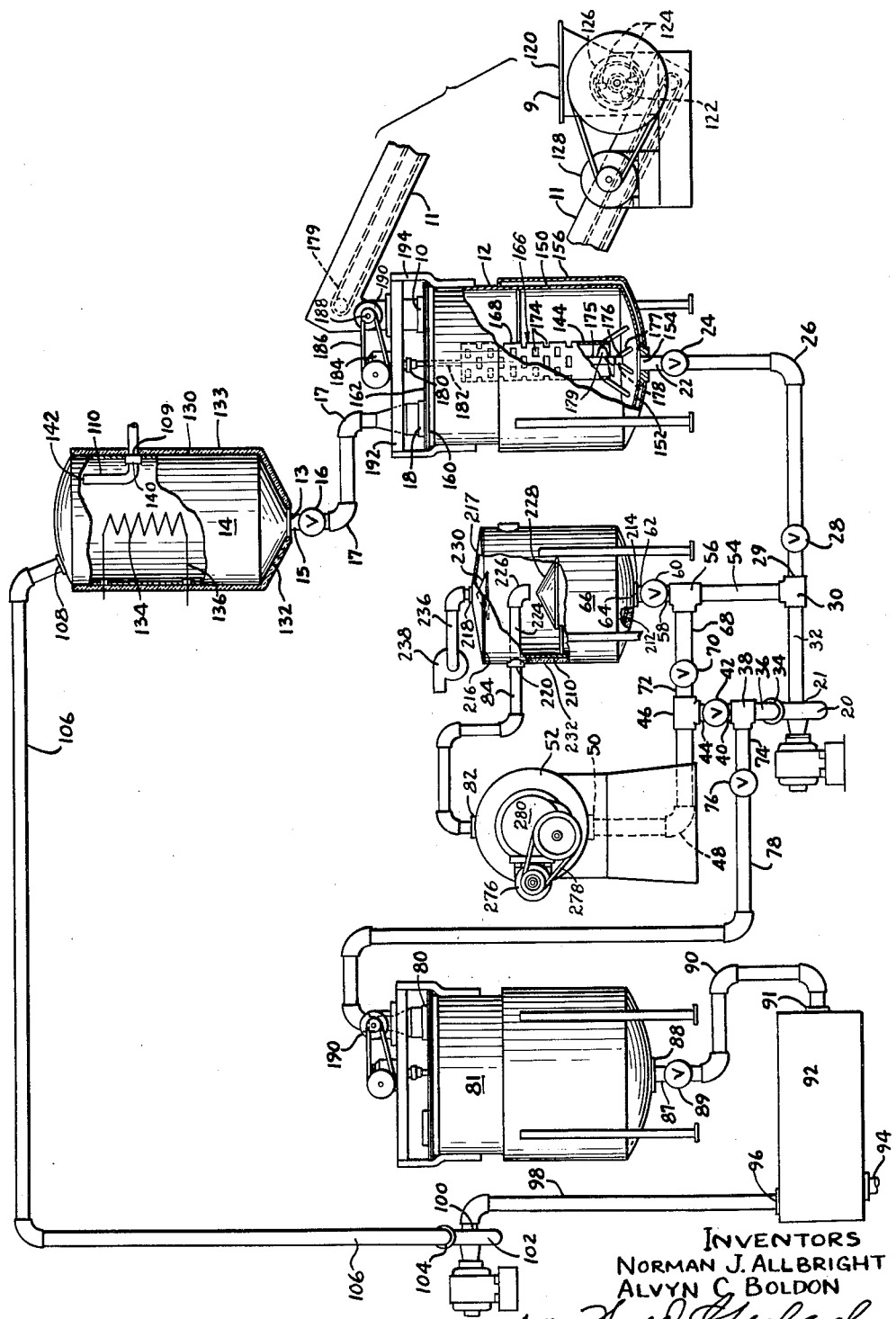

Norman J. Alibright, Hinsdale, and Alvyn C. Boldon, Peoria, Ill.; said Alibright assignor to said Boldon
Filed Mar. 24, 1958, Ser. No. 723,473
2 Claims. (Cl. 23—263)

The present invention relates to a continuous closed-circuit apparatus for rendering animal matter. The invention is designed as an improvement over present day apparatus involving batch methods of rendering animal matter and wherein a given quantity or batch of the material to be rendered is wholly contained and treated in a commercial cooker which, after treatment of the batch, is emptied of its contents and is again refilled with a fresh batch of the raw materials.

The present apparatus involves the use of a slightly modified form of commercial cooker construction and it is capable of carrying out a method which is continuous in the sense that cooking operations are effected by the cooker construction continuously over a given period of time, during which period the cooker operates upon a quantity of the material to be rendered which is considerably in excess of the rated capacity of the cooker, the material being circulated continuously through the cooker automatically. After the material has been thoroughly digested and relieved of much of its moisture, it is pumped to a separating station wherein the cracklings are removed and the grease pumped to a measuring and charging station wherein a portion of the grease is made available for return to the cooker to dilute a subsequent quantity of raw material intended for cooker treatment, while the excess grease is conducted to a region of discharge, the process being repetitious and being conducted without involving batch loading or other manual operations directly upon either the raw materials or upon the end products, i.e., the cracklings or rendered grease.

The method which is carried out in connection with operation of the improved apparatus or system is a closed-circuit recycling method in the sense that, except for the withdrawal of moisture from the materials undergoing rendering, these materials are, instead, automatically processed in a closed hydraulic system and are not exposed or subjected to handling operations after the initial animal products to be treated are loaded into a comminuting apparatus wherein they are rendered suitable for treatment by the system.

The improved apparatus or system has been designed for use primarily in connection with the rendering of inedible animal products from slaughtering plants, and comprising such materials as inedible packinghouse materials, butchers' bones and fats, fallen animals, poultry offal, feathers, hide trimmings, hog hair and the like. The invention is, however, capable of other uses and the same may, if desired, with or without appreciable modification, be employed for rendering edible animal projects such as various parts from freshly slaughtered carcasses which are sweet and have fats adhering thereto, which are of agreeable flavor, color and odor and which contain a low percentage of free fatty acids. Irrespective, however, of the particular use to which the present invention may be put, the essential features of the invention are at all times preserved.

In the rendering of animal projects, whether inedible or edible, the principal function of any rendering system is to separate the free fats from the other products in such a manner that the quality of the separated fats is preserved. To attain this function, utilizing conventional batch methods of dry rendering employing a rendering cooker, careful control of the process is necessary and this control can only be attained by constant attention being given the process from the time each batch is introduced into the cooker until cooking has been completed. The driving off of moisture is always a function of a rendering cooker and the amount of moisture driven off may vary from 15% to as hight as 60% so that loss of moisture during the rendering process reduces the overall content of the cooker. Due to the relatively high temperatures involved, and the length of cooking time required such loss of moisture and reduction in content frequently leads to burning or scorching of the contents of the cooker so that the rendered product, in the case of inedible products is off-color or otherwise injured and, in the case of edible products, may additionally present objectionable taste characteristics.

The present rendering system embodies apparatus which is designed as an improvement over the apparatus used in connection with conventional batch methods of rendering and, toward this end, it contemplates the provision of a semi-continuous system by means of which the materials undergoing treatment are rendered in a conventional cooker which is of slightly modified construction and constitutes one element or unit of the system, the process involved being such that evaporation of moisture is, in the main, caused to take place exteriorly of the cooker from material which has already been treated in the cooker and discharged therefrom to the region of evaporation, such discharge of the material from the cooker for evaporation purposes being accompanied by immediate replacement of the discharged material with substances to be further rendered so that the cooker at all times remains full. By thus maintaining the cooker full during rendering operations, the danger of burning or scorching of the product is obviated. Additionally, for reasons that will be made clear presently, cooker-rendering may be effected at lower temperatures, i.e., with less heat being involved and, despite the fact that lower cooking temperatures are involved, less cooking time for any given quantity of the material is required with none of the product being overcooked.

Stated in somewhat different terms, conventional batch rendering operations involving conventional cookers are predicated upon the treatment to completion of a fixed and given quantity of the raw materials. This fixed quantity of material is introduced itno the cooker at the outset and the thus charged cooker is set into operation and maintained in operation on the original charge until such time as cooking operations are completed, at which time the entire contents of the cooker are emptied and separation of the grease from the cracklings takes place in a crackling pan. The cooker is again charged and the operation repeated. During such conventional treatment of any given batch of material, no further material is introduced into the cooker and evaporation takes place while the material is in the cooker so that the cooker volume is progressively decreased and temperatures progressively rise so that batch-concentration, coupled with high heat, give rise to the danger of overcooking, scorching and the accumulation of carbonaceous deposits within the cooker which must be removed before a new batch can be introduced into the cooker.

The present invention obviates the above-noted limitations that are attendant upon conventional batch methods of rendering and it embodies as one of the principal features thereof the initial addition of a relatively large percentage of prerendered grease from a previous process to a given batch of material to be rendered, with the added grease serving the two-fold function of, first, making the entire batch entirely fluid with a low viscosity so that the batch may be caused to cycle in a closed circuit through the various component units of the system including the cooker, and, secondly, of maintaining a high grease content throughout the cycling materials, including the material contained within the cooker at any given instant, so that localized concentration of the product solids in the cooker will not take place. The absence of a high product concentration in the cooker, coupled with the fact that the cooker is maintained full at all times during cooking operations, eliminates the danger of overcooking, scorching or burning of the product.

In these regards, the present apparatus or system is similar to the system shown and described in our co-pending United States patent application Serial No. 723,472, filed on March 24, 1958, and entitled "Apparatus for Rendering Animal Matter," and much of the apparatus employed for carrying out the system described in such application is capable of use in connection with the present system. The general objects of the present system are, therefore, in the main, similar to the objects set forth in the above-mentioned application and reference may be had to such application for a statement thereof.

It is a specific object of the present invention to provide a continuously operable system of the character briefly outlined above wherein the grease additive for the process, as outlined above, is derived solely from the materials undergoing treatment so that no extraneous additives are required and in which, furthermore, these additives are automatically made available in the correct measured quantity by withdrawing them from a final phase in the system and returning them to an initial phase thereof.

Another object of the invention is to provide such a system wherein the ordinarily difficult and troublesome manual operations involved in emptying batch operated cooker constructions are eliminated by the use of a novel form cooker construction having an inlet opening and an outlet opening, together with selectively operable pumping mechanism by means of which the flow of material through the cooker may be reversed for cooker filling, material recycling, or cooker emptying operations as desired.

A similar and related object of the invention is to provide such a novel form of cooker construction capable of being operated in the manner outlined above and thus being capable of use in connection with the present system.

Other objects and advantages of the invention, not at this time enumerated, will become more readily apparent as the following description ensues.

In the accompanying single sheet of drawing forming a part of this specification, one illustrative embodiment of the invention has been shown and the FIGURE thereof is a schematic representation of the flow sheet type, illustrating the present apparatus or system. In this view, the cooker has been shown schematically but in sufficient detail to show certain novel constructional features thereof.

Referring now to the drawing in detail, briefly, materials delivered to a conventional comminuting or disintegrating device 9 and comminuted or otherwise treated therein are thereafter conducted from the discharge end of the apparatus by means of an elevator or conveyor 11 to one inlet opening 10 at the upper end of a combined preheating and mixing device 12 where they are brought to a predetermined elevated temperature and are mixed with a quantity of free grease which is conducted from the discharge outlet 13 of a heated grease charging and measuring tank 14 through a conduit section 15, a shut-off valve 16 and a conduit section 17 to a second inlet 18 at the upper end of the device 12. The free grease may be caused to flow by gravity to the preheating and mixing device 12, in which case the storage tank 14 will be appropriately elevated above the level of the device 12, but, if the tank 14 is not sufficiently elevated with respect to the device 12, a suitable pumping apparatus may be associated with the conduit 17 for effecting transfer of the grease. The resultant mixture of comminuted raw material and grease is adapted to be withdrawn from the device 12 by means of a pump 20, the lower end of the device 12 being connected to the inlet side 21 of the pump through a conduit section 22, a shut-off valve 24, a conduit section 26, a second shut-off valve 28, a conduit section 29, T-fitting 30, and a conduit section 32. The outlet side 34 of the pump 20 is connected through a conduit section 36, a T-fitting 38, a conduit section 40, a shut-off valve 42, a conduit section 44, a T-fitting 46, and a conduit section 48 to the inlet opening 50 of a cooker 52. The T-fitting 30 is connected through a conduit section 54, a T-fitting 56, a conduit section 58, a shut-off valve 60, and a conduit section 62 to the outlet opening 64 of a flash tank 66, the nature and function of which will be made clear presently. The T-fitting 56 is connected through a conduit section 68, a shut-off valve 70 and a conduit section 72 to the T-fitting 46. The T-fitting 38 is connected through a conduit section 74, a shut-off valve 76, and a conduit section 78 to the inlet opening 80 of a collector and storage tank 81 having agitating and heating means associated therewith as will be described subsequently. The outlet opening 82 of the cooker 52 is connected through a conduit 84 to the flash tank 66. The outlet opening 88 of the collector and storage tank 81 is connected through a conduit 87, a valve 89 and a conduit 90 to the intake side 91 of a separator which may be in the form of a centrifuge 92 having a discharge outlet 94 for cracklings and a discharge outlet 96 for separated grease. The outlet 96 is connected through a conduit section 98 to the inlet side 100 of a pump 102 and the outlet side 104 of the pump 102 is connected through a conduit section 106 to the inlet opening 108 of the grease charging and measuring tank 14. The tank 14 is provided with a side opening 109 having an adjustable L-shaped, overflow tube 110 associated therewith, the nature and function of which will be made clear presently.

The disintegrating or comminuting device 9 may assume various forms, for example, that of a conventional prebreaker such as has been shown and described in United States Patent No. 2,738,932, granted on March 20, 1956, and entitled "Preliminary Disintegrating Machine Adapted to Size Reduce Wood Blocks, Rubber Tires and the Like," and it is deemed sufficient for purposes of description herein to state that such a device includes a receiving hopper 120, internal comminuting mechanism including rotary hammers 122 and stationary anvils 124 and a suitable orifice plate 126 designed to limit the particle size at the output of the apparatus. An electric motor 128 may be employed for driving the device 9.

The conveyor 11 may be of conventional design, for example, of the endless belt type. The lower receiving end of the conveyor is disposed beneath the discharge outlet of the prebreaker 9 so that the material issuing from the orifice plate 126 may fall by gravity on to the conveyor and be conducted therealong upwardly toward the inlet opening 10 of the preheating and mixing device 12.

The storage tank 14 comprises a cylindrical shell 130 having a bottom wall 132 in which the discharge outlet 13 is centrally formed. The shell 130 is insulated by a covering 133 and the contents of the shell are adapted to be heated in any suitable manner, as, for example, by submerged steam heating coils or, as illustrated, by means of an electrical resistance heating unit 134 electrically connected by conductors 136 to a suitable source of energizing current. The adjustable overflow tube 110 is swively connected as at 140 to the side opening 109 and the distal end 142 of the overflow tube may be brought to various elevations within the shell 130 to establish an overflow level for the tank 14 as a whole.

The preheating and mixing device 12 which, as previously described, is adapted to receive the comminuted material from the conveyor 11 and a quantity of pre-rendered grease from the storage tank 14 is in the form of a cylindrical shell 150, the axis of which extends vertically. The lower end of the shell 150 is closed by a bottom wall 152 having a discharge opening 154 connected to the conduit section 22. The shell is steam-jacketed as at 156 in order that heat may be applied exteriorly to the shell to raise the contents of the device 12 to a desired predetermined temperature. The upper open rim 160 of the shell is closed by means of a top wall 162 in which both the charging inlets 10 and 18 are formed. In order to agitate and mix the heated materials contained within the device 12, an agitator assembly is employed and it is designated in its entirety at 166, is disposed centrally within the device and includes a vertically disposed perforate conveyor tube 168 which is open at its top and bottom and is maintained coaxially centered within the shell 150. A series of rectangular perforations or openings 174 are formed in the tube 168 for a purpose that will be made clear presently. Piloted as at 175 in a bearing 176 carried on supports 177 is a shaft 178 carrying a screw conveyor 179. The shaft 178 extends upwardly through the tube 168 and has its upper end operatively connected by a coupling 180 to the output shaft 182 of a gear reduction device 184. The gear reduction device 184 is operatively connected by a belt and pulley arrangement 186 to the drive shaft 188 of an electric motor 190. The motor 190 and the gear reduction device 184 are operatively mounted on a superstructure 192 carried on structural supporting members 194 secured to the shell 150. The shaft 178 is adapted to be rotated in a direction to cause the feed screw 179 to feed the material upwardly through the tube 168. To avoid needless repetition of description, the detailed operation of the combined preheater and agitator device 12 described above will be set forth subsequently when the operation of the entire rendering system is explained.

The flash tank 66 comprises a cylindrical shell 201 having a bottom wall 212 provided. The latter is with a discharge outlet 214 which is connected to the conduit section 62. The upper open rim 216 of the shell 210 is closed by a cover plate 217 having a vapor outlet 218 formed centrally therein. A side inlet 220 adjacent to the top of the shell 210 is provided for introduction of moisture laden materials issuing through the conduit 84 from the cooker 52. An inlet pipe 224 extends through the opening 220 in sealed relationship with respect thereto and carries at its inner end an elbow 226 which is disposed above and in opposition to a spreader and flash cone 228 in centered relation within the shell 210. A baffle plate 230 of cone shape configuration is suspended from the cover plate 216 below the opening 218 and is provided for the purpose of preventing fine solids from being drawn through the outlet 218 under the influence of sub-cooker pressure. The shell 210 is provided with a relatively heavy jacket 232 of insulation. The vapor outlet opening 218 is operatively connected through a conduit 236 to the suction side of a motor-driven, centrifugal pump 238 by means of which the interior of the tank may be maintained at sub-atmospheric pressure.

The cooker 52 may be of any commercial type but preferably it is of the type shown and described in United States Patent No. 2,673,790, granted on March 30, 1954, and entitled "Rendering Cooker," but which has been modified to adapt the same to continuous cooking operation as will be described presently instead of batch cooking operations as described in said patent. The structural details of the cooker 52 have not been fully illustrated herein inasmuch as they are substantially identical with the structural details of the cooker shown in said Patent No. 2,673,790 and reference may be had to such patent for a full understanding of these details. It is deemed sufficient for purposes of illustration herein to describe only the essential elements of the cooker 52 as they are pertinent to the present invention. The cooker 52 is illustrated and described in detail in our aforementioned co-pending patent application Serial No. 723,472 and comprises a tank of cylindrical configuration and with the axis thereof extending horizontally. The tank is of a composite nature and includes inner and outer shell sections defining therebetween a steam jacket for effecting high pressure cooking of the material which is circulated through the interior of the tank. It will be understood, of course, that steam is continuously circulated through the jacket by way of inlet and outlet openings (not shown). Material which is pumped from the flash tank 66 is introduced into the interior of the cooker tank through the inlet opening 50 which is at the bottom of the tank and adjacent to one end thereof. The tank is adapted to be completely filled with the material undergoing rendering at all times during the cooking operation while the material is being recycled through the cooker 52 and the flash tank 66 by the pump 20. The discharge or outlet opening 82 is located at the top of the cooker tank and is positioned adjacent to the other end of the tank. Since the material is, during actual cooking operations, pumped continuously into the interior of the cooker tank through the inlet opening 50, the outlet opening 82 of the device may be regarded as an overflow opening for the cooker.

The cooker 52 is provided with an agitator shaft which extends longitudinally through the central regions of the cooker tank and is adapted to be driven in either direction by power mechanism including a reversible electric motor 276 which operates through a belt and pulley connection 278 and gear reduction device 280 to drive the agitator shaft. The agitator shaft is rotatably mounted in sealed bearings at the opposite ends of the cooker tank and is provided with the usual series of longitudinally spaced impeller paddles carrying deflector blades at the distal ends thereof. The deflector blades, during normal operation of the cooker, serve to impel the material horizontally in the cooker from the inlet opening 50 toward the outlet opening 82. When the direction of rotation of the motor 276 is reversed, these deflector blades will serve to "back-up" the material in the cooker for discharge thereof through the inlet opening 50 at the end of any given cycle of operation when cooking operations are completed for purposes that will be made clear subsequently.

The apparatus described above makes possible a rendering method which has been referred to herein as being continuous in its operation. Such method is predicated upon the fact that predetermined quantities or loads of the material are made up in the correct proportions from material issuing from the prebreaker 9 and withdrawn from the storage tank 14, are thoroughly mixed and heated in the preheating and mixing device 12, and are thereafter delivered from this latter component of the apparatus to the closed-circuit treatment phase wherein the materials are "cooked" and thus rendered to completion by a recycling operation involving the pump 20, the cooker 52 and the flash tank 66, after which a discharge phase of operation is resorted to remove the materials from the closed circuit treatment phase for separation of the grease and cracklings. During each recycling phase on any given load of the material, the next succeeding load is undergoing the necessary preparatory preheating and mixing phase prior to introduction to the closed-circuit phase when the latter has been relieved of its materials.

The collector and storage tank 81 is substantially identical with the preheating and mixing device 12 and has an electric motor 190 for driving its agitator assembly.

Installations involving the present rendering system are capable of accommodating a wide range of capacities and in each instance the relative sizes of the various operative material-containing storage and treatment components of the system will remain proportionately unchanged. Assuming, for purposes of illustration, that the preheating and mixing device 12 has a capacity of 12,000 lbs. the storage tank 9 will have a capacity of 4,000 lbs. so that when its contents are emptied into the device 12, the prebreaker 9 will be required to furnish 8,000 lbs. of raw materials if the device 12 is to be filled to capacity. The cooker 52, the flash tank 66, and the pump 20 are designed to handle for recycling purposes the entire contents of the preheating and mixing device 12 and thus a standard type of cooker having 8,000 lbs. capacity may be modified according to the present invention and utilized in the closed circuit recycling phase in combination with a flash tank having a capacity of 4,000 lbs. Although the pump 20 and the various material handling conduits leading between these various units of the closed cycling phase of the system will be filled during recycling operations the capacities of these conduits may be disregarded, inasmuch as, although the quantities of material involved are not negligible, the tank 66 is capable of operation at capacities somewhat above or below its rated 4,000 lb. capacity.

In the operation of the system, the storage tank 14 will be filled initially with fresh grease or with grease derived from a previous process according to the present system. The valve 16 will be closed. The heating unit 134 will be energized and the contents of the tank 14 brought to the required temperature which may be on the order of 180° F. When the grease in the tank 14 has attained the proper temperature, the valve 16 will be opened and the valve 24 closed so that the heated contents of the tank 14 will flow through outlet opening 13, conduit section 15, valve 16, conduit section 17 and inlet opening 18 and enter the preheating and mixing device 12. At the same time material is supplied from the prebreaker 9 by means of the conveyor 11 and is caused to enter the opening 10 and mix with the grease introduced into the device through the opening 18. During the filling operation the motor 190 is operated or energized so as to set the agitating assembly 166 into operation while at the same time steam is supplied to the steam jacket 156 to maintain the 180° F. temperature within the device 12 so that the contents will be kept in a fluid state. The function of the grease which is supplied to the device 12 for mixture with the raw materials issuing from the conveyor 11 is to afford good lubricating quantities to the mixtures so that it will be capable of flowing in the recycling circuit during rendering operations. As soon as the mixture in the preheating and mixing device 12 has reached the lowermost level of the screw conveyor 179, the material will be elevated within the tube 186 and allowed to flow outwardly through the various openings 174 as the tube gradually becomes filled due to a rise in liquid level in the shell 150. When the shell is substantially full, the action of the screw conveyor 179 will be to expel the material entering the lower end of the tube 168 outwardly through all of the various openings 174 with a fairly equal distribution and with a small quantity of the material overflowing the upper rim of the tube.

After thorough mixture of the materials in the preheating and mixing device 12, the valves 24, 28, 42 and 60 will be opened, while the valves 70 and 76 will be closed. The contents of the device 12 will thus flow through discharge opening 154, conduit section 22, valve 24, conduit section 26, valve 28, conduit section 29, T-fitting 30, conduit section 32, pump 20, conduit section 36, T-fitting 38, conduit section 40, valve 42, conduit section 44, T-fitting 46, conduit section 48, and enter the cooker 52 through the inlet opening 50 thereof. The cooker 52 will gradually become filled with the material and the overflow material will pass outwardly through the outlet opening 82 and enter the conduit 84 from whence it will pass through the inlet opening 220 of the flash tank 56 and substantially fill the latter. It will be understood, of course, that the pump 20 is energized at the time the various valves including the valves 24 and 28 are opened so that the pump is employed to pull the material from the device 12 and fill the recycling circuit including the cooker 52 and flash tank 66. After all of the materials have been removed from the device 12, the valve 28 will be closed and the pump will continue its operation to cause the materials to flow in a local circuit extending from the pump 20 through the cooker 52 and the flash tank 66 by way of the various conduits, as previously set forth.

The materials contained in the closed circuit including the cooker, the flash tank, the pump, and the conduits, are allowed to circulate while the cooker is set into full operation in the usual manner so that the recycling materials will be thoroughly rendered or digested with evaporation taking place in the flash tank in the vicinity of the flash cone 228 under the influence of a relatively large drop in pressure as the materials enter the low pressure environs of the tank 66.

When cooking operations are completed and the desired quantity of moisture removed from the materials being rendered through the vapor outlet 218, the operation of the cooker 52 is stopped, after which the valve 42 is closed and the valves 70 and 76 are opened so that the pump will be caused to remove material from the inlet opening 50 of the cooker 52 and also from the outlet opening 214 of the flash tank 66. The material removed in this fashion from the cooker 52 passes through conduit section 48, T-fitting 46, conduit section 72, valve 70, conduit section 68, T-fitting 56, conduit section 54, T-fitting 30, conduit section 32, pump 20, conduit section 36, T-fitting 38, conduit section 74, valve 76, and conduit section 78, to the collector and storage tank 81. The material removed from the flash tank passes through conduit section 62, valve 60, conduit section 58, T-fitting 56, conduit section 54, T-fitting 30, conduit section 32, pump 20, conduit section 36, T-fitting 38, conduit section 74, valve 76, and conduit section 78, to the inlet 80 of the tank 81.

The motor 276 of the cooker 52 is reversible and, in order to assist the action of the pump 20 in pulling the materials from the cooker as previously described, the motor is reversed so that the impeller paddles will reverse the direction of material-flow in the cooker during these emptying operations.

Prior to discharge of the materials from the recycling phase of the system as previously described, the valve 89 will be closed in order that the collector and storage tank 81 may be filled with the materials issuing from the cooker 52 and the flash tank 66. During filling of the tank 81, the motor 190 will be energized to set the agitator assembly of the tank 81 into operation.

The capacity of the collector and storage tank 81 may be substantially the same as the capacity of the preheating and mixing device 12, this capacity, in the illustrated range of capacities set forth herein being substantially 8,000 lbs. Although the recycling phase of the system has a capacity of 12,000 lbs. and is substantially full at the time recycling operations are commenced, it is contemplated that approximately 4,000 lbs. of moisture will be driven off in the flash tank 66 so that only 8,000 lbs. of rendered material remains available for storage and agitation in the device 81.

After the collector and storage tank 81 has been substantially filled, the materials therein are maintained in a state of agitation while at the same time they are maintained heated by virtue of the steam jacket forming a part of the tank. To discharge the materials from the tank 81, the valve 89 is opened so that the materials will flow by gravity from the outlet opening 88 through the valve 89 and conduit 90 and enter the centrifuge 92 through the inlet opening 91 thereof. The cracklings are withdrawn from the centrifuge through the discharge outlet 94 while the rendered grease passes upwardly through the outlet 96 under the influence of the pump 102. This rendered (grease) is conducted through conduit section 98, pump 102 and conduit section 106 to the inlet opening 108 of the storage tank 14 to replenish the supply of grease previously discharged from this tank during the preceding operation.

It will be understood that by adjusting the position of the overflow tube 110, the quantity of grease retained in the shell 130 of the tank 14 may be varied and grease entering the shell 130 in excess of the retained volume of grease will be discharged through the side opening 109 from whence it may be conducted by suitable piping to a storage or settling tank.

The invention is not to be limited to the exact arrangement of parts shown in the accompanying drawing or described in this specification as various changes in the details of construction may be resorted to without departing from the spirit of the invention. For example, while the moisture-content of the materials undergoing rendering in the system have been described as being repeatedly subjected to cooking operations in the cooker 52 and the flash tank 66 by recirculation of these materials in a closed circuit path leading through these two instrumentalities, it is within the scope of the invention to effect such repetitious moisture evaporation by passing the materials successively through a series of operatively connected alternately arranged cookers and flash tanks with the last flash tank in the series discharging all of the materials to the collector and storage tank 81. Only insofar as the invention has particularly been pointed out in the accompanying claims is the same to be limited.

Having thus described the invention what we claim as new and desire to secure by Letters Patent is.

1. An apparatus designed successively to render predetermined quantities of animal matter and comprising a storage container having a grease inlet and a grease outlet, means for heating the contents of said storage container, a preheating and mixing tank having a grease inlet and an inlet for animal matter, a grease conduit establishing communication between the storage container outlet and the grease inlet of said preheating and mixing tank, a shut-off valve in said grease conduit, means for supplying animal matter to the second mentioned inlet of the tank for admixture with grease supplied to said tank through the grease inlet thereof, means for applying heat to said tank to raise the temperature of the contents thereof, means for agitating the heated contents of the tank to produce a heated flowable mixture therein, a cooker comprising a closed receptacle having a fluid inlet in the bottom region thereof and a fluid outlet at the top thereof, a flash tank having a fluid inlet in the upper region thereof, a vapor outlet at the top region thereof and a fluid outlet in the bottom region thereof, a first fluid conduit establishing communication between the fluid outlet of the cooker and the fluid inlet of the flash tank, a second fluid conduit establishing communication between the fluid outlet of the flash tank and the fluid inlet of the cooker, a motor-operated pump operatively disposed in the second fluid conduit, a second shut-off valve connected to said second fluid conduit and located between the pump and the fluid inlet of the cooker, said cooker, flash tank, pump and first and second fluid conduits forming together a closed fluid circuit, valve-controlled means for transferring said heat flowable mixture from the preheating and mixing tank to said closed fluid circuit, said pump being adapted when driven while the second shut-off valve is open to cause the heated flowable mixture in said closed circuit to flow successively downwards through the flash tank and upwards through the cooker, a collector tank having a fluid inlet and a discharge outlet, a third fluid conduit establishing communication between said collector tank fluid inlet and said second fluid conduit at a point between the pump and the second shut-off valve, a third shut-off valve in said third fluid conduit, said third fluid conduit being adapted when the pump is driven while the second shut-off valve is closed and the third shut-off valve is open to conduct the processed mixture from said closed circuit to said collector tank, a separator connected to receive the processed mixture from said collector tank and having a fluid inlet, a discharge outlet for cracklings and a discharge outlet for grease, a fourth fluid conduit establishing communication between said grease discharge outlet of the separator and the grease inlet of said storage container, and a pump operatively disposed in said fourth fluid conduit and adapted when driven to cause grease to flow from said grease discharge outlet of the separator through said fourth fluid conduit to said storage container.

2. A rendering apparatus as set forth in claim 1 and wherein the closed fluid circuit has associated with it a branch fluid conduit which has one end thereof connected to the second fluid conduit at a point between the second shut-off valve and the fluid inlet of the cooker and its other end connected to said second fluid conduit at a point between the first mentioned pump and the fluid outlet of the flash tank; and, in addition, a fourth shut-off valve which is operatively connected to, and forms a part of, said branch fluid conduit and is adapted to be closed when the second shut-off valve is open and the heated flowable mixture is pumped through said closed fluid circuit by the first mentioned pump and to be opened when said second shut-off valve is closed and the processed mixture is pumped by the first mentioned pump through the third fluid conduit to the collector tank.

References Cited in the file of this patent
UNITED STATES PATENTS

| | | |
|---|---|---|
| 1,966,181 | Lowry | July 10, 1934 |
| 2,744,630 | Hughes | May 8, 1956 |